United States Patent

[19]

Hottinen

[11] Patent Number: 5,831,984
[45] Date of Patent: Nov. 3, 1998

[54] RECEPTION METHOD AND CDMA RECEIVER

[75] Inventor: Ari Hottinen, Koulukatu, Finland

[73] Assignee: Nokia Telecommunications Oy, Espoo, Finland

[21] Appl. No.: 481,467

[22] PCT Filed: Nov. 9, 1994

[86] PCT No.: PCT/FI94/00503

§ 371 Date: Aug. 29, 1995

§ 102(e) Date: Aug. 29, 1995

[87] PCT Pub. No.: WO95/14336

PCT Pub. Date: May 26, 1995

[30] Foreign Application Priority Data

Nov. 10, 1993 [FI] Finland ................................. 934966

[51] Int. Cl.⁶ .................................................. H04J 13/00
[52] U.S. Cl. .......................................... 370/441; 375/205
[58] Field of Search .............................. 370/18, 252, 320, 370/335, 342, 295, 441, 401, 519, 241; 375/205, 206, 234; 395/2.2, 2.29, 2.32

[56] References Cited

U.S. PATENT DOCUMENTS

| | | | |
|---|---|---|---|
| 4,894,842 | 1/1990 | Broekhoven et al. | 375/200 |
| 5,136,612 | 8/1992 | Bi | 375/200 |
| 5,237,586 | 8/1993 | Bottomley | 375/200 |
| 5,268,927 | 12/1993 | Dimos et al. | 375/200 |
| 5,321,949 | 6/1994 | Lemson | 455/67.1 |
| 5,339,384 | 8/1994 | Chen | 395/2.2 |
| 5,343,496 | 8/1994 | Honig et al. | 375/200 |
| 5,353,300 | 10/1994 | Lee et al. | 375/200 |
| 5,377,225 | 12/1994 | Davis | 375/206 |
| 5,515,378 | 5/1996 | Roy et al. | 370/347 |

OTHER PUBLICATIONS

IEEE Transactions on Communications, vol. 40, No. 7, Jul. 1992, Behnaam Aazhang et al.

IEICE Trans. Commun., vol. E76–B, No. 8, Aug. 1993, T. Miyajima et al.

IEEE Transactions on Information Theory, vol. 35, No. 1, Jan. 1989, Lupas et al.

Communication Systems, An Introduction to Signals and Noise in Electrical Communication, Third Edition, A. Bruce Carlson, pp. 640–643.

Varanasi, Aazhang, "Multistage Detection in Asynchronous Code–Divisio;n Multiple–Access Communications", IEEE Transactions on Communications, vol. 38, pp. 509–519.

Lupas, Ruxandra, "Near–Far Resistance of Multiuser Detectors in Asynchronous Channels", IEEE Transactions on Commnications, vol. 38, No. 4, Apr. 1990, pp. 496–508.

Kohonen, Teuvo, "The Self–Organizing Map", Proceedings of the IEEE, vol. 78, No. 9, Sep. 1990, pp. 1464–1480.

Kohonen, Teuvo, "Generalizations of the Self–Orgainzing Map", Proceedings of 1993 International Joint Conference on Neural Networks, IJCNN'93, Nagoya, Japan, Oct. 25–29, 1993, pp. 457–463.

(List continued on next page.)

Primary Examiner—Dang Ton
Attorney, Agent, or Firm—IP Group of Pillsbury Madison & Sutro LLP

[57] ABSTRACT

A CDMA receiver including an antenna, radio frequency parts, an A/D converter, an adaptive linear prestage and an adaptive nonlinear detector. In a reception method used in a CDMA system, the detector detects several users' signals simultaneously and is responsive to a received signal for correcting parameters to be used for detection to correspond to signal states of the received signal. For an optimal detection of the received signal, an output signal of the linear prestage of the receiver supervises setting the parameters for the adaptive nonlinear detector.

19 Claims, 2 Drawing Sheets

OTHER PUBLICATIONS

Kohonen, Teuvo, "Things You Haven't Heard About the Self–Organizing Map", Proceedings of the 1993 IEEE Int. Conf. Neural Networks, San Francisco, USA, Mar. 28–Apr. 1, 1995, pp. 1147–1156.

Kohonen et al., "Start–Up Behaviour of a Neural Network Assisted Decision Feedback Equaliser in a Two–Path Channel", Proc. of IEEE Int. Conf. on Communications, Chicago, USA, Jun. 14–18, 1992, pp. 1523–1527.

Benvenuto et al., "A Comparison Between Real and Complex Valued Neural Networks in Communication Applications", Proc. of Int. Conf. Artificial Neural Networks, Espoo, Finland, Jun. 1991, pp. 1177–1180.

Battiti, Roberto, "Accelerated Backpropagation Learning: Two Optimization Methods", Complex Systems 3, pp. 331–342, 1989.

Poggio et al., A Theory of Networks for Approximation and Learning, MIT memo No. 1140, 1989.

Shepanski, J. F. Fast Learning in Artificial Neural Systems: Multilayer Perception Training Using Optimal Estimation, ICNN, 1988.

Cooper et al. *Modern Communications And Spread Spectrum,* "Detection of Spread–Spectrum Signals", McGraw–Hill, New York 1986, Chapter 13, pp. 345–375.

Kohonen, Teuvo, "Self–Organization and Associative Memory", Springer–Verlag, Berlin–Heidelberg–New York–Tokio, Third edition, 1989.

RECEPTION METHOD AND CDMA RECEIVER

BACKGROUND OF THE INVENTION

The invention relates to a reception method to be used in a CDMA system, in which signals of several users are detected simultaneously from a received signal, an adaptive nonlinear decision rule is utilized for detection and parameters of a detector are supervised on the basis of the received signal to correspond better to signal states of the received signal.

CDMA is a multiuser system based on spread-spectrum technique, the application of which system to cellular radio systems has started recently, besides the previous FDMA and TDMA systems. CDMA has several advantages compared to the previous methods, such as simplicity of frequency planning and spectrum efficiency.

In the CDMA method, a narrow-band data signal of a user is multiplied to a relatively broad band by a spreading code having a considerably broader band than the data signal. Bandwidths used in known test systems are for instance, 1,25 MHz, 10 MHz and 25 MHz. In connection with the multiplication, the data signal spreads to the whole band to be used. All users transmit simultaneously by using the same frequency band. Each connection between a base station and a mobile station uses its own spreading code and the signals of the users can be separated from each other in receivers on the basis of each user's spreading code. The purpose is to select the spreading codes in such a way that they are mutually orthogonal, i.e. they do not correlate with each other.

Correlators in a CDMA receiver implemented in a conventional manner are synchronized with a desired signal, which is detected on the basis of a spreading code. The data signal is returned to the original band in the receiver by remultiplying it by the same spreading code as was used for spreading the original narrow band signal at the transmission stage. In an ideal case, the signals multiplied by some other spreading code do not correlate and do not return to the narrow band. Thus, they appear as noise with respect to the desired signal. Accordingly, the aim is to detect a desired user's signal from among several interfering signals. In practice, spreading codes are not decorrelatable and other users' signals make the detection of the desired signal more difficult by distorting the received signal nonlinearly. This interference caused by the users to each other is called a multiuser interference.

The single-user detection method described above is not optimal, because it ignores in connection with detection the information included in other users' signals. Additionally, conventional detection is not capable of correcting nonlinearities, which are partially caused by nonorthogonal spreading codes and a distortion of a signal on a radio path. An optimum receiver considers the information included in the signals of all users so that the signals may be detected optimally by using the Viterbi algorithm, for instance. An advantage of this detection method is that bit error ratio curves of the receiver resemble a situation of the single-user CDMA system with no multiuser interferences occurring. No near-far problem exists, for instance. The term near-far problem refers to a situation in which a transmitter close to a receiver covers with its transmission the transmitters located farther away. The most serious deficiency of the Viterbi algorithm is that the computational intensity required increases exponentially with an increasing number of users. For instance, a ten-user system having a bit rate of 100 kbit/s using QPSK modulation would require 105 millions of measurements to be made per second for a computation of the likelihood function. In practice, this prevents implementation of the optimum receiver.

An optimum receiver can, however, be approximated by different methods. As prior art are known different kinds of methods for simultaneous multiuser detection. To the best known methods belong ones using a linear multiuser detector, decorrelating detector or multistage detector. These methods are described in more detail in the references Varanasi, Aazhang; Multistage detection for asynchronous code division multiple access communications, IEEE Transactions on Communications, vol 38, pp. 509–519, April 1990, Lupas, Verdu: Linear multiuser detectors for synchronous code-division multiple access channels, IEEE Transactions on Information Theory, vol 35, no. 1, pp. 123–136, January 1989, and Lupas, Verdu: Near-far resistance of multiuser detectors in asynchronous channels, IEEE Transactions on Communications, vol 38, April 1990. Other known multiuser detection methods are disclosed in U.S. Pat. Nos. 5,353,300 and 5,343,496 referred to here. All these methods have, however, the drawback that they do not track changes taking place on a radio channel.

SUMMARY OF THE INVENTION

Accordingly, the present invention sets forth a novel manner of approximating an optimum receiver. The method in question is more resistant to interferences occurring both on transmission path and in transmitter. Traditional multiuser detection algorithms are fixed to a predetermined channel model, on the basis of which they have been designed. The method of the invention is not interested in a theoretical channel model, since the algorithm itself tends to model distortions occurred on the channel. The method is adapted to the prevailing situation, even if the origin of interferences were not known. For instance, a received signal may contain transmissions the spreading code of which is not known by the receiver. These may be, e.g., transmissions monitored from the region of a neighbouring cell. The adaptation of the method is faster than that of the previous neural network applications.

This is achieved by means of a reception method of the type set forth in the foregoing BACKGROUND section, which method is characterized in that the received signal is processed before detection at an adaptive linear prestage, which supervises setting the parameters for the adaptive nonlinear detector.

The invention relates further to a CDMA receiver, comprising an antenna, radio frequency parts, an A/D converter, an adaptive linear prestage and an adaptive nonlinear detector means, the detector means detecting several users' signals simultaneously and being responsive to a received signal for correcting parameters to be used for detection to correspond to signal states of the received signal. The CDMA receiver according to the invention is characterized in that an output signal of the linear prestage supervises setting the parameters for the adaptive nonlinear detector means.

By means of the method of the invention, an optimum receiver can be approximated with a desired accuracy. The receiver according to the method adapts quickly and accurately to randomly time-varying propagation conditions on a radio path, which conditions distort a received signal. In such systems, the detector according to the invention adapts well by means of a very little amount of learning information. By combining several learning algorithms in such a way that the most suitable method for each situation is used, a very short learning time can be achieved. As to traditional neural network applications, a realization thereof has been prevented in practice by the length of the learning time.

Accordingly, in a preferred embodiment of the invention, the adaptive detector is realized by means of a neural network, such as an adaptive signal point system, in which each point of the signal point system corresponds to one possible combination of signals transmitted by several users. The points of the adaptive signal point system are positioned on right locations, e.g. by means of a specific training period included in a received signal. In the preferred embodiment, the adaptive linear prestage supervising the detector performs an estimation of channel parameters. According to a second preferred embodiment, the points of the adaptive signal point system are counted in an unsupervised manner by means of a self-organizing map, for instance. According to a third preferred embodiment of the invention, both above-mentioned initialization methods of the signal point system can be used in optional order and alternately, if necessary. Further, decision feedback methods can be utilized for supervising the neural network.

BRIEF DESCRIPTION OF THE DRAWINGS

In the following, the invention will be described in greater detail with reference to the examples according to the attached drawings, in which.

DETAILED DESCRIPTION

Figure 1A:
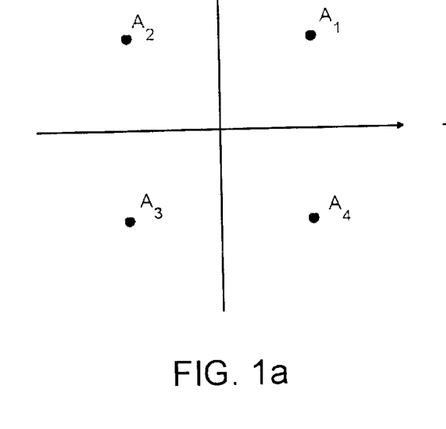
FIGS. 1a and 1b illustrate the form of a received signal at matched filter outputs.

Signals modulating in digital data transmission obtain only discrete values, such as $\pm A_c$, $\pm 3A_c$, at sampling moments. Accordingly, these discrete values shall be identified in a receiver from an often distorted signal having crossed a radio path. FIG. 1a shows an ideal undistorted signal pattern of two users, i.e. a point density function of received signals, where the peaks of the function are situated at crossed points. Each point of a two-dimensional pattern signifies one possible received signal value, which depends on the values of the signals transmitted by the users. For instance, point $A_1$ could signify a situation (1,1), meaning that a first user has transmitted the value 1 and a second user the value 1. Correspondingly, point $A_2$ could signify a situation (−1,1), meaning that the first user has transmitted the value −1 and the second user the value 1. Point $A_3$ could signify a situation (−1,−1) and point $A_4$ a situation (1,−1). If there were three users, the pattern would be three-dimensional, and the dimension of the pattern grows with an increasing number of users, respectively.

Figure 2:
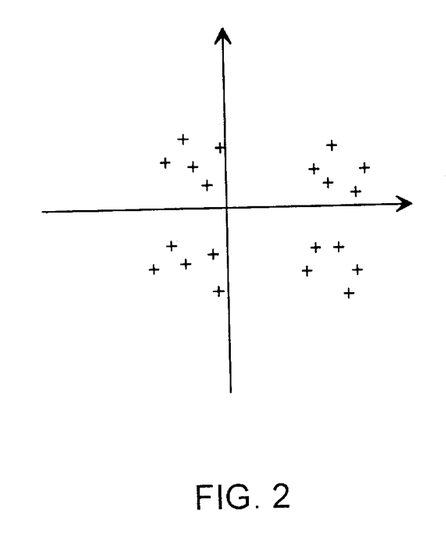
FIG. 2 illustrates an example of points indicated by code vectors.

FIG. 2 illustrates distortion of a signal pattern caused by nonorthogonal codes and occurred on the radio path of a receiver at the output of spreading-code-matched filters. The peaks of the point density function have spread and moved due to the distortion. The received signal points have moved from their ideal locations, and the task of the receiver is to interpret the received signals to belong to some of the predetermined signal points.

Figure 1B:
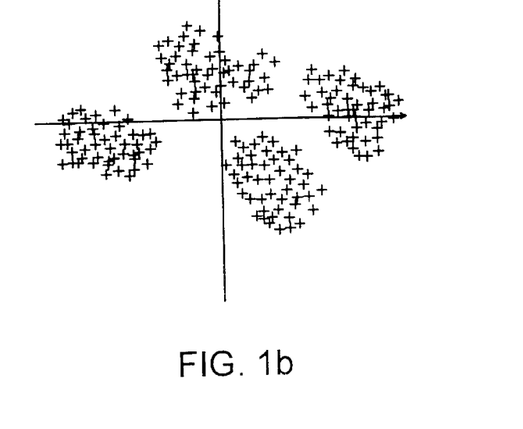

If decisions were made fully linearly, plenty of faulty decisions would appear on account of the distorted point system, as is seen from FIG. 1b. By means of the method according to the invention, it is possible to realize, for instance piecewise linear decision boundaries, by which the optimal nonlinear detection can be approximated with a desired accuracy.

Suppose that the system has K users, i.e. CDMA transmitters, each of them having a specific spreading code of its own differing from the others $$s_k(t) = \sum_{j=1}^{N} S_k^{(j)} \Pi_{T_c}(t - jT_c)$$

where the jth chip of the kth user's spreading code is marked, k=1,2 ... K. $T_c$ is the length of the chip. The waveform of the kth user is restricted within $[0, T_b]$. Each user transmits in the same frequency band data symbols $\in A$ modulated by the specific spreading code of its own, where A is the used symbol alphabet. The task of the receiver is then to demodulate a signal, which is, by using e.g., BPSK modulation method, of the form $$r(t) = \sum_{i=-P}^{P} \sum_{k=1}^{K} h_k(t) b_k^{(i)} s_k(t - iT - \tau_k) + n_t, t \in T$$

where 2P+1 is the number of symbols to be transmitted, $n_t$ is a noise term, T is the duration of the symbol and $b_k^{(i)} \in \{-1,1\}$ signifies the kth user's information bit in the ith time slot, $\tau_k \in [0,T]$ signifies the kth user's time deviation and $h_k(t)$ an impulse response of the kth user's physical channel. For the sake of clarity, it is assumed below that $\tau_k = 0$, $\forall k \in \{1, ... K\}$, which means that the system is synchronous. However, the invention can be applied also to an asynchronous system in a corresponding manner.

Let us suppose further that the impulse response of a multipath channel is of the form $$h_k(t) = \sum_{l=1}^{L} h_{k,l}(t) \delta(t - \tau_{k,l}(t))$$

where the kth user's lth complex channel tap is marked $h_{k,l} \in C$ and they are assumed to be either constants or fading as a function of time.

At multiuser detection, decisions on received signals are made simultaneously for all K users. In this example, it is supposed that the channel has Gaussian noise and the bits transmitted by all K users simultaneously at a predetermined moment are marked in a vector form $b \in \{-1,1\}^K$. It is known that a maximum likelihood decision to be made in the receiver is based on a logarithmic likelihood function $$b_{opt} = arg_{b \in \{-1,1\}^k} \max \{2y'b - b'Hb\}$$

where H is a matrix of crosscorrelations between the used spreading codes, i.e. $(H)_{ij} = <S_i, S_j>$, i,j=1,2, ... ,K and the vector y comprises the matched filter outputs of the receiver. The above equation can be solved by means of a Viterbi type algorithm, but computational complexity prevents an implementation of an optimum receiver of this type in practice, as has been stated above.

Accordingly, a signal received by the receiver has the above form r(t). The signal can be processed, e.g. by using filtering at chip frequency or filtering at symbol frequency. The first manner can be described by the formula $$r[j] = \int_{jT_c}^{(j+1)T_c} r(t)dt$$

assuming that one sample per chip is taken. On the other hand, the latter manner is illustrated by the formula $$z_{k,l}^{(i)} = \int_{-\infty}^{\infty} r(t)s_k(t - \tau_{k,l} - iT_b)dt$$

It will be explained below how the above output signals of filters can be described for certain neural network structures and how a neural network of the method according to the invention is supervised by means of learning algorithms and which advantages are achieved by the method of the invention.

Various decision rules differ from each other, as far as the used metric and searching algorithm are concerned, by which algorithm the state describing the signal best is searched for. Different metrics and distance measures are described in the reference Teuvo Kohonen: Self-Organization and Associative Memory, Springer-Verlag, Berlin-Heidelberg-New York-Tokyo, 3rd edition, 1989, and as an example of those is given here a measure based on projection or filtering, where the vector $m_{opt}$ modelling the signal state is the vector to which the received signal has the largest projection:

$$m_{opt} = \arg\min_i \frac{m_i^T x}{\|m_i\| \|x\|}$$

Another alternative is e.g., a so-called Mahalanobis distance or a weighted Euclidean metric, where $$\begin{aligned} m_{opt} &= \arg\min \|m_i - x\|_\phi \\ &= \arg\min \sqrt{(m_i - x)^T \phi(m_i - x)} \end{aligned}$$

where $\phi$ is a weighting coefficient given for the distance and depending on the correlations of the codes. Various decision rules and learning algorithms relating to them are used in the present invention in order to achieve the best result. An optimum decision can be realized by the weighted Euclidean metric, but the complexity of the decision is very high. Referring to the above formulas, it is found that the vector x of this embodiment is e.g., of the form $$x = [r[j-J], r[j-J+1], \ldots, r[j+J]]^T,$$

where the different elements represent chip-matched filter outputs influencing the jth decision. Correspondingly, the form $$x = (z_{1,1}, z_{1,2}, \ldots, z_{K,L})^T,$$

can be used, where the elements are obtained from code-matched filter outputs.

Firstly, vector quantization neural networks are discussed, and subsequently, feed forward neural networks.

Vector Quantization Neural Network (VQNN) methods are often called generally by the term neural networks, since the used learning algorithms are considered to be neural.

The VQNN method utilizes a detection method based on an adaptive multidimensional signal point system. Received discrete signals are compared with the signal point system of the receiver and the received signal value is classified as belonging to that point of the signal point system which is located at the shortest calculated distance. In a first preferred embodiment of the invention, the adaptive signal point system is corrected by means of a training period included in the received signal. In this manner, the receiver is capable of adapting to a distortion of the received signal by distorting the signal point system, correspondingly.

The method described is called Learning Vector Quantization (LVQ), and it has been applied earlier in connection with pattern recognition problems. The method is described in more detail in the reference already mentioned, Teuvo Kohonen: Self-Organization and Associative Memory, Springer-Verlag, Berlin-Heidelberg-New York-Tokio, 3rd edition, 1989.

In another preferred learning algorithm, the receiver corrects the adaptive signal point system by means of a Self-Organizing Map (SOM). No separate training period is then needed. This self-organizing map method has been applied earlier in connection with pattern recognition problems in the same way as LVQ and it has been described in greater detail both in the reference mentioned above and in the references Teuvo Kohonen: The Self-Organizing Map, Proceedings of The IEEE, 78(9): pp. 1464–1480, 1990, Kohonen: Generalizations of the Self-Organizing Map, Proc. of the International Joint Conference on Neural Networks, IJCNN'93, Nagoya, Japan, Oct. 25–29, 1993, Kohonen: Things You Haven't Heard about the Self-Organizing Map, Proceedings of the 1993 IEEE Int. Conf. Neural Networks, San Francisco, USA, Mar. 28–Apr. 1, 1993, pp. 1147–1156, and Kohonen, Raivio, Simula, Henriksson: Start-Up Behaviour of a Neural Network Assisted Decision Feedback Equalizer in a Two-Path Channel, Proc. of IEEE Int. Conf. on Communications, Chicago, USA, Jun. 14–18, 1992, pp. 1523–1527.

In the VQNN methods, the detection thus utilizes a set of classification points and a received signal is classified to the point which is considered to be nearest. The method or the decision rule by which the nearest classification point is determined can be changed during detection. In a CDMA application, a set of nearest classification points can be calculated by projection, for instance, and the final decision by means of a weighted (Euclidean) metric. Such a multiphase solution is computationally efficient in CDMA applications, where the number of possible classes is large.

If the channel parameters and the used spreading codes are known by the receiver and the receiver uses code-matched filters, code vectors can be determined a priori by the formula

M=RWB, where W is a diagonal matrix consisting of complex tap coefficients multiplied by signal energies, B is a matrix of bit combinations (a preferred representation includes K linearly independent bit vectors) and R is a matrix of crosscorrelations. Accordingly, if the delays of the codes are known and there is no need for code tracking, the representation is very simple. If the code delays are not known, as is the case in a cellular radio system, a receiver prestage can be used, consisting of a plurality of N-dimensional matched filters, which span a signal space, but are not necessarily matched to the spreading codes or to the above-mentioned chip-matched filtering.

Accordingly, an initialization of a VQNN network can be performed in the method of the invention by means of an adaptive prestage calculating the channel parameters, on the basis of which are obtained good initial values for the network before the actual training starts. Training can thus be speeded up considerably compared to the previous methods.

The LVQ and SOM methods will be described below by way of example from the point of view of the method according to the present invention.

An optimum CDMA receiver simultaneously used by several users functions nonlinearly, responsive to sufficient statistics given by spreading-code-matched filters. In this context, the LVQ and SOM methods can be used for estimating optimal Bayesian decision boundaries. The Bayesian decision boundaries separate the classes from each other in such a way that as few errors as possible occur.

Each possible discrete signal state can be considered to constitute its own class $\omega_k$. Each class is determined by a number of code vectors, the dimension of which can be determined depending on application. In a synchronous CDMA, the dimension of the code vectors can be for instance the same as the number of users. In an asynchronous CDMA, the dimension is optimally K(P+1), but the number of computations will then grow high. As per situation, a suboptimum information arrived during symbol time [0,T] can also be accepted, the dimension of the code vector being then e.g. 2(K−1).

The number of code vectors per class depends on the approximation accuracy desired. If there is only one code vector in each class, the decision boundaries are linear. The more code vectors have been set, the more accurately the decision making approximates the optimum receiver, the decision boundaries being piecewise linear and the complexity increasing with an increasing number of code vectors. Each class can also contain a different number of code vectors. Each code vector indicates some point representing the class. After a preliminary number of code vectors has been set for each class, the system adjusts the code vectors to indicate some point preliminarily. Channel parameters can be utilized for selecting this preliminary point. During signal detection, the system adjusts the code vectors to indicate the optimal point at each moment.

Assume that a certain number I of code vectors has been set for the system. All users' discrete signal samples to be received from matched filter outputs are marked by a vector y at each moment. Code vectors are marked $m_i$, i=1, . . . I. The code vector $m_c$ which is closest to the signal sample y is obtained e.g., by calculating a Euclidean distance $$c = \arg\min_i \{\|y - m_i\|\}.$$

The above manner of distance calculation is only one possible method for determining a distance. Other manners have been set forth in the references cited above. In the method according to the invention, the manner of calculating the nearest code vector can be changed during symbol detection, as has been explained already. The distance metric or decision rule to be used may be changed e.g., on the basis of received signal, channel properties or receiver stage.

Code vectors $m_i$ are now corrected on the basis of a received signal sample according to the following formulas, for instance:

$m_c(t+1)=m_c(t)+\alpha_c(t)(y(t)-m_c(t))$, if $y, m_c \in \omega_i$ $m_c(t+1)=m_c(t)+\alpha_c(t)(y(t)-m_c(t))$, if $y \in \omega_j$, $m_c \in \omega_i$, i≠j $m_i(t+1)=m_i(t)$, otherwise. Accordingly, the uppermost equation in the above group of equations deals with a case when a signal sample has been classified right, the second equation a situation when a signal sample has been classified wrong. Other correction equations are presented in the references cited above. Individual learning coefficients α can be determined, for instance as follows:

$$\alpha_c(t) = \frac{\alpha_c(t-1)}{1 + s(t)\alpha_c(t-1)}$$

where s(t)=1 for the right classification and −1 for the wrong classification. The points of the signal point system thus adapt according to the received signal and the decision making accuracy is maintained, though the signal is distorted and the distortion varies as a function of time.

A signal received according to the LVQ contains a learning period, according to which the neighbourhood can be adjusted.

Figure 3:
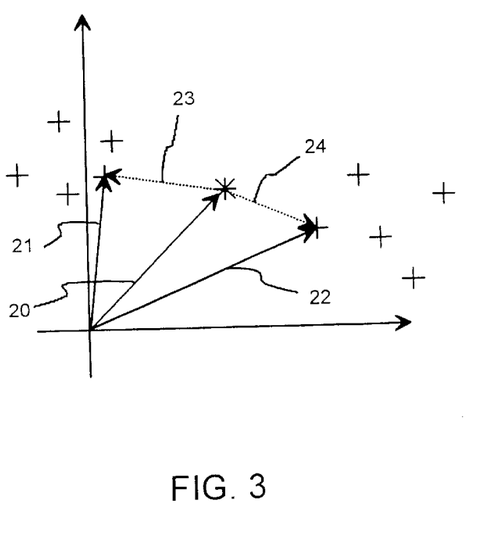
FIG. 3 shows an example of computing the nearest code vector.

In the two-dimensional example of FIG. 1a, each signal point $A_1 \ldots A_4$ can be considered to constitute its own class $\omega_k$. For instance, five code vectors can be selected to represent each class $A_1 \ldots A_4$, FIG. 2 showing the points indicated by the vectors. FIG. 3 illustrates a calculation of the nearest code vector. A received signal is a vector 20, and distances between the code vectors and the vector 20 are calculated according to the method. Distance vectors 23 and 24 between the received vector 20 and the code vectors 21 and 22 are drawn in FIG. 3 as an example. The shortest of them is selected, which is 24 in the case of the figure. In this way, the system classifies that the vector 20 belongs to the class represented by the code vector 22.

In the method based on a self-organizing map, the learning process, i.e. the correction of code vectors, differs from the LVQ therein that a received signal does not include any specific learning period, but the self-organizing map groups the code vectors directly on the basis of the received signal to a location where the number of received signal points is higher. Consequently, it adapts automatically. The signal points are not divided into classes either, as in the LVQ. A topological neighbourhood $N_c$ of a point indicated by a code vector $m_c$ is constituted by surrounding neighbouring points at a desired depth. A correction of the location of the neighbourhood of the received code vector can now be performed for instance on the basis of the following equations:

$m_i(t+1)=m_i(t)+\alpha(y(t)-m_i(t))$, i=c $m_i(t+1)=m_i(t)+\beta(y(t)-m_i(t))$, i∈$N_c$, i≠c $m_i(t+1)=m_i(t)$, i∉$N_c$ Other correction equations have been set forth in the references specified above.

Accordingly, the points of the adaptive signal point system can be corrected to their right locations either by means of the LVQ or the SOM. It is also possible to use both above methods alternately. For instance, the signal points can be accumulated on their right locations by utilizing a self-organizing map, and subsequently, the class points for the LVQ are determined by means of training vectors. After this, the receiver may use the SOM for keeping the signal points on their correct locations. Correspondingly, if there exists a preliminary estimate for the class points, the LVQ method can be used in the beginning, and in case of a change of channel, for instance, the data can be accumulated again by the SOM method. If necessary, the code vectors are classified by means of a training set.

A drawback of a signal point system of above type is that the size of the signal point system can be very large, whereby searching for the optimal signal point system is complicated. However, the searching can be concentrated only on a small subset, as follows: 1) A suboptimal decision is initially made on part of the dimensions of a vector x. The suboptimal decision can be realized by means of a filter bank or a decorrelator, for instance. 2) A complete searching for the vector x is performed in such a way that part of the dimensions are fixed at step 1). At multiuser detection, strong signals and the dimensions of the vector x corresponding to those signals can preferably be detected suboptimally and an optimal searching based on Euclidean metric can be performed for the weakest users only.

Subsequently, an alternative manner of realizing an adaptive nonlinear decision is described. An essential difference with respect to the above is that here, the detection is based on nonlinear filtering and the training is based on minimizing a mean square error by a nonlinear algorithm. Nonlinear detector training can here be initialized by means of a linear adaptive prestage in such a way that the training is speeded up essentially. Based on LMS or MMSE criteria, the adaptive linear prestage can, for instance, estimate receiver filters, from which can be calculated a correlation matrix, which is, in turn, utilized for nonlinear detection.

A neural network structure of another type is discussed next, to which the reception method according to the invention can be applied. The terms "feed forward neural network" refers to a non-cyclic network, in which an input vector $x_{in} \in R^d$ is mapped to an output vector $x_{out} \in R^q$ according to certain weighting coefficients $W_{ij}$ and possible nonlinearities $\delta_{k1}$. Parameters d, l and q define the dimensions of input, hidden and output layer.

It is previously known that a cell of a neural network calculates the output value by means of the formula $$x_i = f\left( \sum_j W_{ij} x_j \right) + \text{bias}$$

where f is some continuously differentiable nonlinear function, such as $$f(x) = \tanh(x) = \frac{e^x - e^{-x}}{e^x + e^{-x}}$$

or $$f(x) = \frac{1}{1 + e^{-x}}$$

Figure 5A:
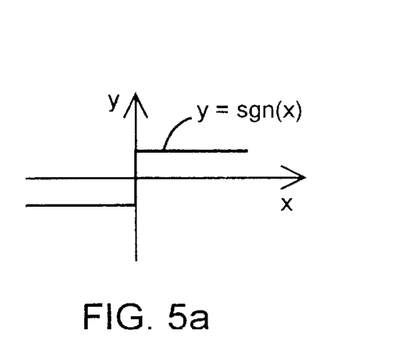
FIGS. 5a and 5b illustrate the similarity of a traditional signal decision function and a hyperbolic tangent function and FIGS. 6a and 6b illustrate an example of a one-layer and two-layer neural network.
Figure 5B:
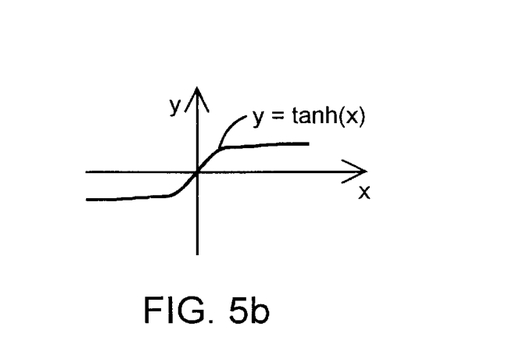

The hyperbolic tangent $f(x)=\tanh(x)$ is a particularly suitable nonlinear element, since it is close to a traditional detector based on signal decision. This is illustrated in FIGS. 5a and 5b, FIG. 5a showing the function $y=\text{sgn}(x)$ making a traditional signal decision and FIG. 5b showing the function $y=\tanh(x)$.

The above-mentioned formula of the output value can be written in the form $$x_i = f(W_k^T x) + \text{bias}$$

This corresponds to a conventional matched filter prestage, for which $W_k^T \equiv S_k$. The above formulas are intended for real input signals and they can also be applied in a complex space, which is typically used in telecommunication applications in such a way that the number of input connections is doubled (separate connections for the real and imaginary parts of each user). Another alternative is to use complex neurons and a corresponding learning rule, as explained in the reference N. Benvenuto, M. Marchesi, F. Piazza, A. Uncini: A comparison between real and complexvalued neural networks in communication applications, Proc. Int. Conf. Artificial Neural Networks, Espoo, Finland, June 1991, pp. 1177–1180.

Figure 6A:
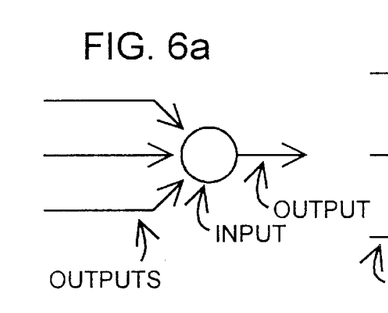
Figure 6B:
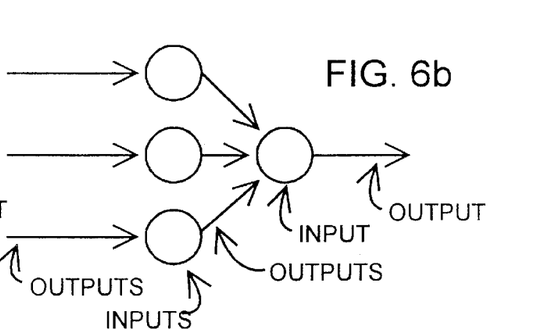

A multilayer neural network is assembled by connecting neuron outputs of layer i to inputs of layer i+1. FIG. 6a illustrates one neuron and FIG. 6b a two-layer network.

In case of a two-layer network, a mapping of an input vector takes place according to the following equations:

$$\text{net}_1 = W_1 \begin{bmatrix} 1 \\ x \end{bmatrix}$$

$$\text{out}_1 = f(\text{net}_1)$$

$$\text{net}_2 = W_2 \begin{bmatrix} 1 \\ \text{out}_1 \end{bmatrix}$$

$$y = f(\text{net}_2)$$

where $W_1$, $W_2$ and f are determined as above, $\text{net}_1$ and $\text{out}_1$ map a calculation of a first layer, $\text{net}_2$ and y a calculation of a second layer, when y is the output value of the network. When the input values are in matrix form, the network maps the input data according to the following formulas:

$$N_1 = W_1 X,$$

$$O_1 = \begin{bmatrix} 1 \ldots 1 \\ f(N_1) \end{bmatrix}$$

$$N_2 = W_2 O_1,$$

$$Y = f(N_2),$$

where f is a suitable nonlinear function and $W_1$ and $W_2$ are weight matrices of the layers.

The mapping of a neural network is marked by g( ) as follows:

$$g: R^i \times R^p \rightarrow R^o$$

$$y = g(x, w)$$

where i, p and o signify dimensions of input, hidden and output layer and the vector w comprises the components of the matrices $W_1$ and $W_2$ mentioned previously. Neural network training comprises setting the vector w (or the matrices $W_1$ and $W_2$, respectively) in such a way that the mapping performed by the network corresponds to the desired mapping as accurately as possible. In a telecommunication application, the aim is thus to train the network in such a way that the received signal can be detected as faultlessly as possible by means of the mapping. The correctness of the mapping can be measured typically by a mean square error:

$$E = \frac{1}{n} \sum_{i=1}^{n} \|g(x_i, w) - t_i\|^2$$

$$= \frac{1}{n} \sum_{i=1}^{n} \|y_i - t_i\|^2$$

$$= \frac{1}{n} \|Y - T\|_F^2$$

where $(x_i, t_i), i=1, \ldots N$ is a set of training and target vector pairs. Target vectors are known values, by means of which the network can be trained. With large dimensions, a calculation according to the above formula requires a high capacity.

For feed forward network training, a plurality of methods have been developed, such as e.g., backpropagation training utilizing a gradient method for minimizing the error function. In the gradient method, a gradient of the error function with respect to the weight function w is calculated, on the basis of which gradient the weight function is updated:

$$w_{new} = w_{old} + \Gamma \nabla E(w),$$

where $\Gamma$ determines the size of correction step.

For the present invention, it is not essential as such which training method is used after the initial values have been set. Other possible training methods are disclosed in the references R. Battiti: Accelerated backpropagation learning: Two optimization methods, Complex Systems 3, pp. 331–342, 1989, Poggio, Girosi: A theory of networks for approximation and learning, MIT memo no: 1140, 1989 and J. F. Shepanski: Fast learning in Artificial Neural Systems: Multilayer perception training using optimal estimation, ICNN, 1988.

Neural network training is typically started by setting random values for weight coefficients, which values will then be trained towards the correct values. The method of the invention utilizes an adaptive prestage giving information, e.g. channel parameters, by which information initial values corresponding better to the real situation can be set for the weight coefficients, and in this manner, the actual training can be speeded up considerably. This corresponds to the situation described earlier in connection with VQNN networks when initial values were set for the code vectors.

By using the previously presented two-layer network as an example, it is also possible to give the values of the weight coefficient matrix $W_1$ randomly and to calculate the matrix $W_2$ in the manner mentioned in the above Shepanski reference, for instance. When known input values X, to which correspond output values Y, and known target values T are used, a minimization is necessary $$\|T-Y\|_F^2 = \|T - f(W_2 O_1)\|_F^2$$

or alternatively $$\|W_2 O_1 - f^{-1}(T)\|_F^2$$

The above equations do not necessarily lead to the same final result. The solution of the latter equation is of the form $$W_2 = f^{-1}(T) O_1^+$$

where $O_1^+$ is a pseudoinverse matrix of $O_1$. This approach does not give the optimal weight matrices, but it produces the fastest learning in general. It is also possible to apply linear regression techniques to every gradient iteration when the value of the matrix $W_1$ is updated and to update the $W_2$ by means of linear regression.

One way of initializing a network is to utilize a conventional decorrelating detector for calculating the weighting coefficients of the first network layer. The weighting coefficients of the second layer can be calculated by the backpropagation method or by the Shepansky method. Further, it is possible to update the weighting coefficients obtained by means of the decorrelating detector of the first layer by the backpropagation method. The known training methods of the network have already been described previously.

In the reception method according to the invention, the learning can be speeded up considerably by using known learning methods in a novel manner, which is especially suitable for a telecommunication application. A network training is performed assuming initially that the network does not contain nonlinearities in the hidden layer. Once sufficiently good initial values have been obtained, the nonlinear elements of the hidden layer are taken into consideration and the following network layers are trained for instance, recursively. In the method of the invention, a training period can be used in each phase, though a specific advantage of the invention consists in that long training periods are not needed.

If a set of matched filters is used as a detector prestage, initial weighting coefficient estimates can be mapped to the next layers in a CDMA application directly by means of the formula $W_i = W_o - I$, where I refers to an identity matrix having the same dimension as W. After the initialization, it may be proceeded to decision feedback training.

Figure 4:
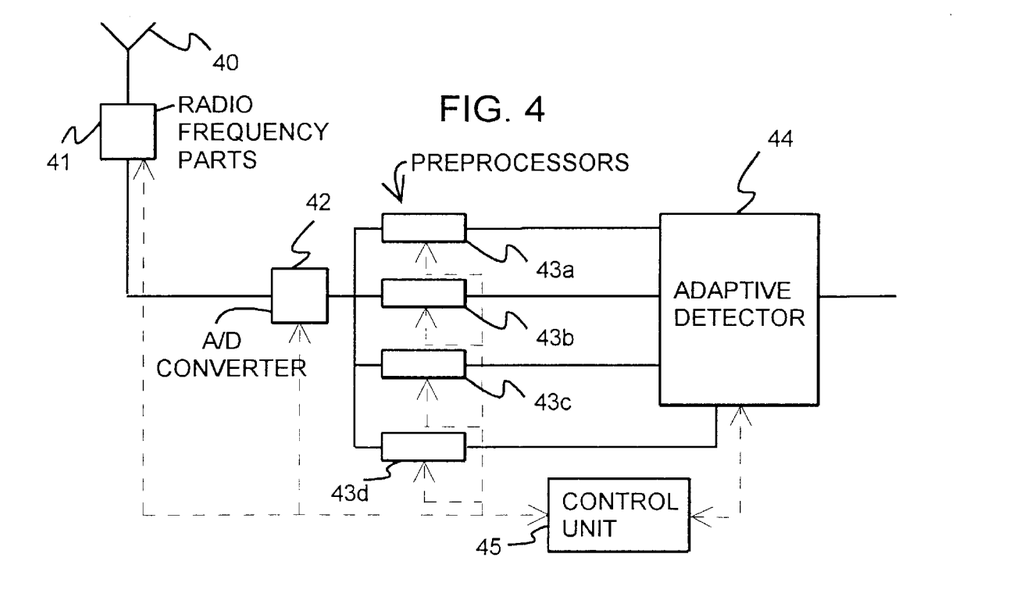
FIG. 4 shows the structure of a receiver according to the invention.

FIG. 4 illustrates the structure of a CDMA receiver according to the invention, the receiver being in this example a base station receiver. However, the invention is suitable for being used also in a mobile station, respectively. The receiver comprises an antenna 40, by which a received signal is brought via radio frequency parts 41 to an A/D converter 42. The converted signal is brought to means 43a to 43d preprocessing the received signal. In a preferred embodiment of the invention, the means perform an estimation of channel parameters. The means may be realized e.g., by RAKE receivers, each of them receiving a signal transmitted by one user. The receiver additionally comprises a control unit 45 controlling the operation of the device. Each RAKE receiver includes several separate correlators, each of them capable of receiving one multipath propagated signal component. These received signal components are preferably combined in a RAKE receiver. The structure of the RAKE receiver has been described in more detail in the reference G. Cooper, C. McGillem: Modern Communications And Spread Spectrum, McGraw-Hill, New York 1986, Section 12.

Consequently, each RAKE receiver 43a to 43d receives one user's signal (and its multipath propagated components). From each RAKE receiver, the signal is brought to an adaptive detector 44 detecting the received multiuser signals simultaneously by utilizing an adaptive nonlinear decision rule and the above-described initialization and training methods according to the invention.

Accordingly, the receiver of the invention can be realized also without RAKE receivers. The efficiency of the LVQ and SOM methods is sufficient as such in a multipath case, if the dimension of the code vectors is increased to correspond to the spreading caused by an impulse response. This concerns also a feed forward neural network.

Also, some other linear or nonlinear conversion of a received signal may be preformed in the preprocessing means, such as multiplication by decorrelating matrix, which leads to a decision statistics of the decorrelating detector.

Although the invention has been described above referring to the examples of the attached drawings, it is obvious that the invention is not restricted to them, but it can be modified in many ways within the scope of the inventive idea set forth in the attached claims. For instance, neural networks of different types can be cascade-connected in a desired manner so that a training as efficient as possible and a decision rule as simple and good as possible can be provided.

I claim:

1. A reception method in a CDMA system, comprising the steps of:
   (a) providing an adaptive non-linear detector, having settable parameters, for detecting signals of several users simultaneously in a received signal, using an adaptive non-linear decision rule;

(b) filtering a received signal which contains signals of several users at one of chip frequency and symbol frequency, to obtain a filtered signal, and processing the filtered signal, all, prior to detection of the received signal by said detector, at an adaptive linear prestage, and on the basis of said received signal as thereby filtered and processed, supervising setting of said parameters of said detector, to correspond better to signal states of said received signal including adapting to randomly time-varying signal propagation conditions which distort the received signal; and (c) detecting said signals of several users simultaneously in said received signal using said detector having said parameters set by practicing step (b).

2. The method of claim 1, wherein:
step (b) comprises estimating of channel parameters for said detector by said adaptive linear prestage.

3. The method of claim 2, wherein:
step (b) comprises calculating predecisions for said detector on the basis of said channel parameters.

4. The method of claim 1, further comprising:
receiving a signal using a receiver having a linear stage to provide said received signal, followed by a non-linear stage;
changing said decision rule and a training algorithm suitable therefore on the basis of said received signal and whether said received signal is being processed in said linear stage or detected in said non-linear stage of said receiver.

5. The method of claim 1, further comprising:
initializing said decision rule and a training algorithm suitable therefore on the basis of channel parameters of said detector.

6. The method of claim 1, wherein;
step (b) includes supervising said parameters on the principle of learning vector quantization.

7. The method of claim 1, wherein;
step (b) includes supervising said parameters by use of a self-organizing map.

8. The method of claim 1, wherein:
step (b) includes supervising said parameters by use of decision feedback.

9. The method of claim 1, wherein:
step (a) includes operatively incorporating a neural network in said detector, for causing said detector to be nonlinearly adaptive.

10. The method of claim 9, wherein:
said neural network is provided so as to include a plurality of nonlinear neurons, each such nonlinear neuron having an output which depends on the distance between a signal point modelling the respective said nonlinear neuron, and a signal arriving at an input of the respective nonlinear neuron.

11. The method of claim 1, wherein:
step (a) includes operatively incorporating an adaptive multidimensional signal point system in said detector, for causing said detector to be non-linearly adaptive.

12. The method of claim 10, wherein:
said adaptive multidimensional signal point system is provided to have a plurality of signal points, each of which represents a respective one possible combination of signals transmitted by said several users.

13. The method of claim 11, further comprising:
classifying each symbol received in said received signal to a respective signal point which is closest to the respective received symbol.

14. A reception method in a CDMA system, comprising the steps of:

(a) providing an adaptive non-linear detector, having settable parameters, for detecting signals of several users simultaneously in a received signal, using an adaptive non-linear decision rule;

(b) processing a received signal which contains signals of several users prior to detection by said detector, at an adaptive linear prestage, and on the basis of said received signal supervising setting of said parameters of said detector, to correspond better to signal states of said received signal;

(c) detecting said signals of several users simultaneously in said received signal using said detector having said parameters set in step (b);
    step (a) including operatively incorporating a neural network in said detector, for causing said detector to be non-linearly adaptive;
    said neural network being provided so as to include nonlinear neurons, each having an output which depends on the distance between a signal point modelling the respective nonlinear neuron, and a signal arriving at an input of the respective nonlinear neuron;
    said adaptive multidimensional signal point system being provided to have a plurality of signal points, each of which represents a respective one possible combination of signals transmitted by said several users; and (d) classifying each symbol received in said received signal to a respective signal point which is closest to the respective received symbol;
said classifying comprises searching for each closest signal point by:
    using a suboptimal linear decision rule for reducing possible signal points, to provide a reduced signal point system; and
    searching for a signal point corresponding best to a respective said received symbol in said reduced signal point system, using an optimal distance measure.

15. A CDMA receiver, comprising:
an antenna, radio frequency parts, an analog to digital converter, an adaptive linear prestage, and a non-linear detector, all operatively interconnected;
said detector being arranged to simultaneously detect signals of several users;
said detector being responsive to a received signal containing said signals for correcting parameters to be used for detection of said signals, to correspond to signal states of said received signal including adapting to time-varying signal propagation conditions which distort the received signal;
a filter for filtering said received signal prior to detection by said detector, at one of chip frequency and symbol frequency, to obtain a filtered signal; and
said adaptive linear prestage being arranged, by processing said filtered signal, to set said parameters for said detector.

16. The receiver of claim 15, wherein:

said adaptive linear prestage is arranged to perform estimation of channel parameters for said detector.

17. The receiver of claim 15, wherein said adaptive linear prestage is arranged to set parameters for said detector by comprising:

means for supervising parameters of a decision rule to be used for detection using a self-organizing map.

18. The receiver of claim 15, wherein said adaptive linear prestage is arranged to set parameters for said detector by comprising:

means for supervising parameters of a decision rule to be used for detection using the principle learning vector quantization.

19. The receiver of claim 15, wherein said adaptive linear prestage is arranged to set parameters for said detector by comprising:

means for supervising parameters of a decision rule to be used for detection using decision feedback.

\* \* \* \* \*